United States Patent [19]
Perlman et al.

[11] Patent Number: 5,557,745
[45] Date of Patent: Sep. 17, 1996

[54] METHOD FOR SUPPORTING FOREIGN PROTOCOLS ACROSS BACKBONE NETWORK BY COMBINING AND TRANSMITTING LIST OF DESTINATIONS THAT SUPPORT SECOND PROTOCOL IN FIRST AND SECOND AREAS TO THE THIRD AREA

[75] Inventors: Radia J. Perlman, Acton, Mass.; Ian M. C. Shand, Cobham, United Kingdom; Christopher W. Gunner, Harvard, Mass.

[73] Assignee: Digital Equipment Corporation, Maynard, Mass.

[21] Appl. No.: 407,802

[22] Filed: Mar. 20, 1995

Related U.S. Application Data

[63] Continuation of Ser. No. 882,495, May 13, 1992, abandoned, which is a continuation-in-part of Ser. No. 577,437, Sep. 4, 1990, Pat. No. 5,251,205.

[51] Int. Cl.⁶ ............................... G06F 9/00; G06F 15/00
[52] U.S. Cl. ............................... 395/200.02; 395/200.01; 370/85.12; 370/60; 364/229; 364/242.94; 364/DIG. 1
[58] Field of Search ...................................... 395/800, 200, 395/200.01, 200.02, 200.1, 200.15, 200.18; 370/54, 58, 60, 79, 85.12, 85.13, 85.14, 89, 86, 90, 93, 94, 94.1; 340/825.4

[56] References Cited

U.S. PATENT DOCUMENTS

| | | | |
|---|---|---|---|
| 4,766,534 | 8/1988 | DeBenedictis | 395/200 |
| 4,864,559 | 9/1989 | Perlman | 370/60 |
| 5,086,426 | 2/1992 | Tsukakoshi et al. | 370/85 |
| 5,249,292 | 9/1993 | Chiappa | 395/650 |
| 5,251,205 | 10/1993 | Callon et al. | 370/60 |
| 5,301,303 | 4/1994 | Abraham et al. | 395/500 |
| 5,430,727 | 7/1995 | Callon | 370/85.13 |

OTHER PUBLICATIONS

*Fault–Tolerant Broadcast of Routing Information*, R. Perlman, North-Holland Computer Networks 7 (1983).

*An Algorithm for Distributed Computation of a Spanning Tree in an Extended LAN*, R. Perlman, Digital Equipment Corporation, 1984.

*Enhanced AppleTalk Phase 2 Routing*, Preliminary Specification and Internet Draft (RFC), Apple Computer, Inc., Nov. 27, 1991.

*Primary Examiner*—Meng-Ai T. An
*Attorney, Agent, or Firm*—Arnold, White & Durkee

[57] ABSTRACT

A method of transferring foreign protocol information across a hierarchical backbone network is disclosed. The hierarchical backbone network operates according to a first protocol and includes multiple areas, some of which have a destination that operates according to a second protocol. Additionally, each area has at least one router located therein. The locations of the destinations in each area are identified to the router in that area. Information that identifies the locations of the destinations in each area is transferred to a router in each of the other areas regardless of whether the destinations are located in the same area as the router. Finally, information formatted according to the second protocol is transferred among any of the destinations.

5 Claims, 4 Drawing Sheets

METHOD FOR SUPPORTING FOREIGN PROTOCOLS ACROSS BACKBONE NETWORK BY COMBINING AND TRANSMITTING LIST OF DESTINATIONS THAT SUPPORT SECOND PROTOCOL IN FIRST AND SECOND AREAS TO THE THIRD AREA

This is a continuation application of application Ser. No. 07/882,495 filed May 13, 1992, now abandoned, which is a continuation-in-part of application Ser. No. 577,437, filed Sep. 4, 1990, now U.S. Pat. No. 5,251,205.

FIELD OF THE INVENTION

The present invention relates to the transfer of information in computer networks and, more particularly, to a method for transferring foreign protocol information across a hierarchical backbone network.

BACKGROUND OF THE INVENTION

As computer networks have grown larger and more complex, a variety of operating protocols have evolved. Often, it is desirable to allow communication between widely spaced networks of a given protocol that are not directly connected for that protocol. Various methods have been developed to facilitate this function. Two main problems impair communication between these "foreign" protocols (i.e. protocols that are different from the most frequently used protocol in the network).

First, in hierarchical networks, it is difficult to find out information about destinations located in other network areas. In particular, it is extremely difficult to find destinations in other network areas that support a foreign protocol. Prior attempts to allow communication between foreign protocol destinations have contemplated the passage of information about the location of foreign protocol destinations from a router in which the foreign protocol destination is contained to one other area. In other words, routers in previously known systems have the capability of passing address information about foreign protocol destinations to one other area. No facility exists that allows a level two router receiving the foreign protocol destination information to pass it to other network areas.

Second, assuming that the locations of foreign protocol destinations are known, the efficient transfer of foreign protocol information between network areas has been hindered by logistical difficulties encountered merely by attempting to traverse network areas that operate under a different protocol. One specific problem is that presently existing methods of passing foreign protocol information do not efficiently account for basic differences between the way the cost of the transfer is calculated by the differing protocols. Another shortcoming of prior art systems is that they do not provide any means to optimize the routing of foreign protocol information between areas. A method of transferring foreign protocol information across a hierarchical backbone network that overcomes the aforementioned problems is desirable.

SUMMARY OF THE INVENTION

The present invention facilitates the transfer of foreign protocol information over a hierarchical backbone network by allowing level two routers in the network to pass along information that they have learned about the existence of foreign protocol destinations to other network areas, regardless of whether that information came from an adjacent area. An alternative embodiment of the present invention allows foreign protocol information to be passed between network areas through tunnels established without modification to the level two routers. Still another embodiment of the present invention employs the modification of level two routers in network areas where such modification is feasible while allowing tunnels to be established between areas in which modification of the associated level two routers is not feasible. The present invention also provides the capability to accommodate different systems of accounting for cost across networks whose protocols differ as to how cost information is managed. Finally, the present invention provides a method of transferring foreign protocol information across a hierarchical backbone network that optimizes routing of the foreign protocol information, reducing network traffic and cost of information transfer.

BRIEF DESCRIPTION OF THE DRAWINGS

Other advantages of the invention will become apparent upon reading the following detailed description and upon reference to the accompanying drawings, in which.

Figure 1:
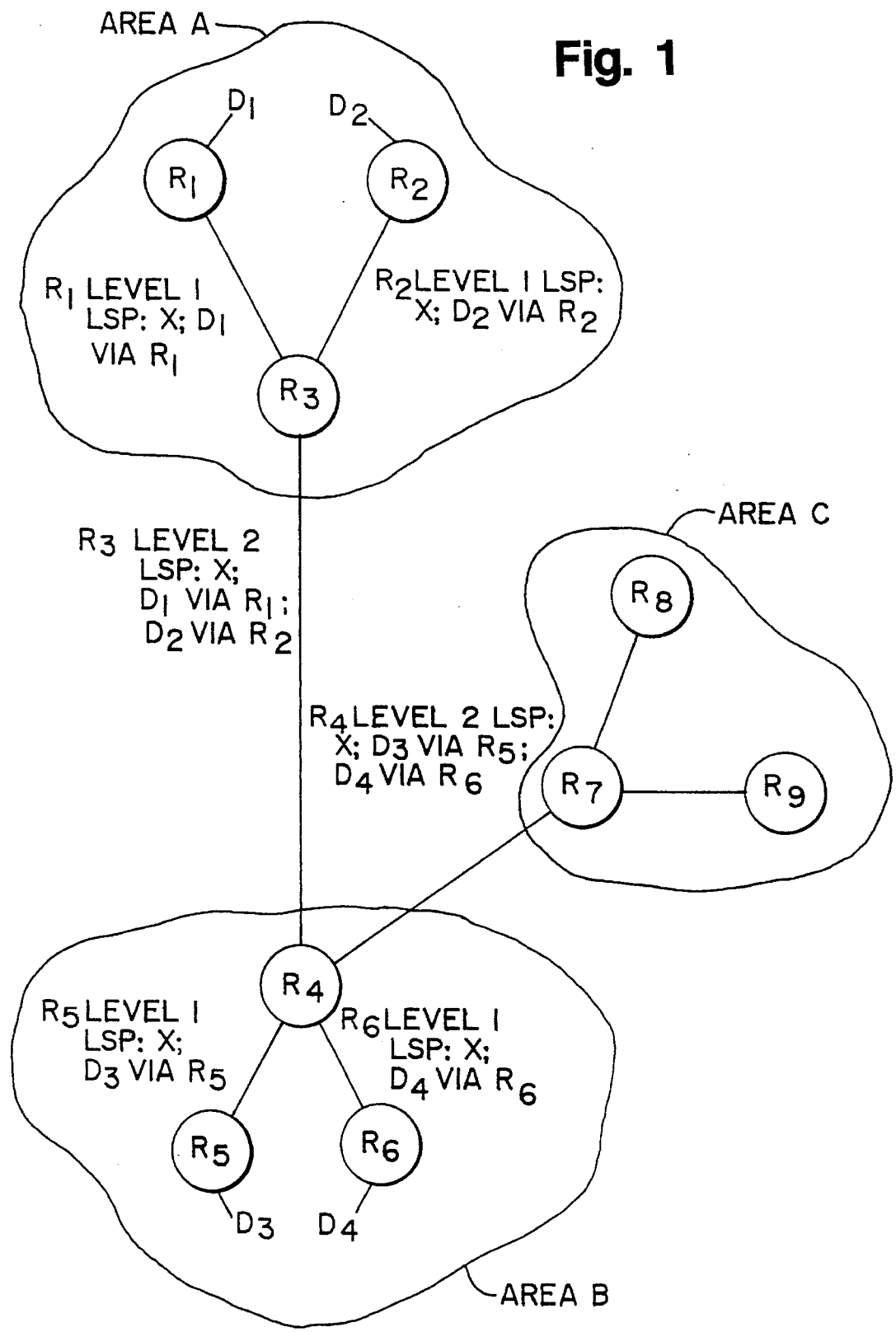
FIG. 1 is a simplified schematic diagram of a network topology in which foreign protocol destinations communicate between areas via modified level two routers.

While the invention is susceptible to various modifications and alternative forms, specific embodiments thereof have been shown by way of example in the drawings and will herein be described in detail. It should be understood, however, that the invention is not intended to be limited to the particular forms disclosed. On the contrary, the applicants' intention is to cover all modifications, equivalents, and alternatives falling within the spirit and scope of the invention as defined by the appended claims.

DETAILED DESCRIPTION OF THE PREFERRED EMBODIMENTS

For clarity and consistency, several abbreviations are used herein. Network areas are identified by letters (e.g. area A, etc.). Routers are identified as "$R_n$," where n is a unique numeric designator. Tunnels between network areas are designated as "$T_n$," where n is a unique numeric designator. The establishment of tunnels between routers is well-known to those of ordinary skill in the field. The foreign protocol operating in a destination in a given network area is referred to as protocol X. Furthermore, to facilitate discussion of the present invention, the assumption is made that the protocol operating in the backbone network is the IS-IS protocol. A router that is configured to support both IS-IS and protocol X is referred to as an XIS-router and a router that only supports protocol X is referred to as an X-router. The procedures for configuring routers are well-known to those skilled in the art. The steps taken to configure routers are not an essential feature of the present invention. Novel aspects of the invention do, however, reside in part to the activities that the routers are configured to perform. Foreign protocol destinations are referred to as "$D_n$," where n is a unique numeric designator.

As shown in the accompanying drawings by way of illustration, the present invention relates to a method of transferring foreign protocol information across a hierarchical backbone network. As previously noted, two main problems reduce the efficacy of the transfer of foreign protocol information across networks. The first of these problems is identifying foreign protocol destinations to other areas in the network. Obviously, if a foreign protocol destination in area A is not known to exist by area B, no communication between area B and the foreign protocol destination in area A is possible.

Depending on the specifics of protocol X, it may not be necessary to learn the identities of all the XIS-routers in other areas to allow communication of foreign protocol information therebetween. If it is necessary to identify all XIS-routers, several methods are contemplated by which this can be accomplished. Prior art methods for transferring information about the existence of foreign protocol destinations are very limited. One such prior art method is to establish a communication path between at least one pair of routers in each pair of areas in which a protocol X destination exists. However, this prior art method only allows a router in area B to inform a router in area C about information inside area B. No capability exists to allow the router in area B to pass information about area A to area C.

The present invention provides a much more flexible approach to spreading information about the existence of protocol X destinations throughout the network. The first method contemplated by the present invention exploits the well-known fact that the IS-IS protocol supports link state packets ("LSPs"). At least one level two XIS-router in each area adds the destinations of all routers that support protocol X in its area to its level two LSP. Additionally, the level two router adds the list of all XIS-routers discovered through its level two database to its level one LSP. This method is described in detail below with reference to FIG. 1.

This exchange of information between levels can be made subject to filtering so that only selected information is exchanged. Furthermore, information passed from level two to level one may be encoded in level one LSPs to identify it as level two information. This encoding can be used to prevent this information from being further passed back from level one to level two.

Another contemplated method of identifying XIS-routers according to the present invention is to establish tunnels between enough pairs of routers in different areas so that there is a path of tunnels from any area having a protocol X destination to any other area having a protocol X destination. As will be appreciated by those having ordinary skill in the field, the network layer address of a tunnel endpoint must be known before a tunnel can be established between two areas. Additionally, any applicable filtering information identifying protocol X destinations between which communication through the tunnel is permitted must be known.

Figure 2:
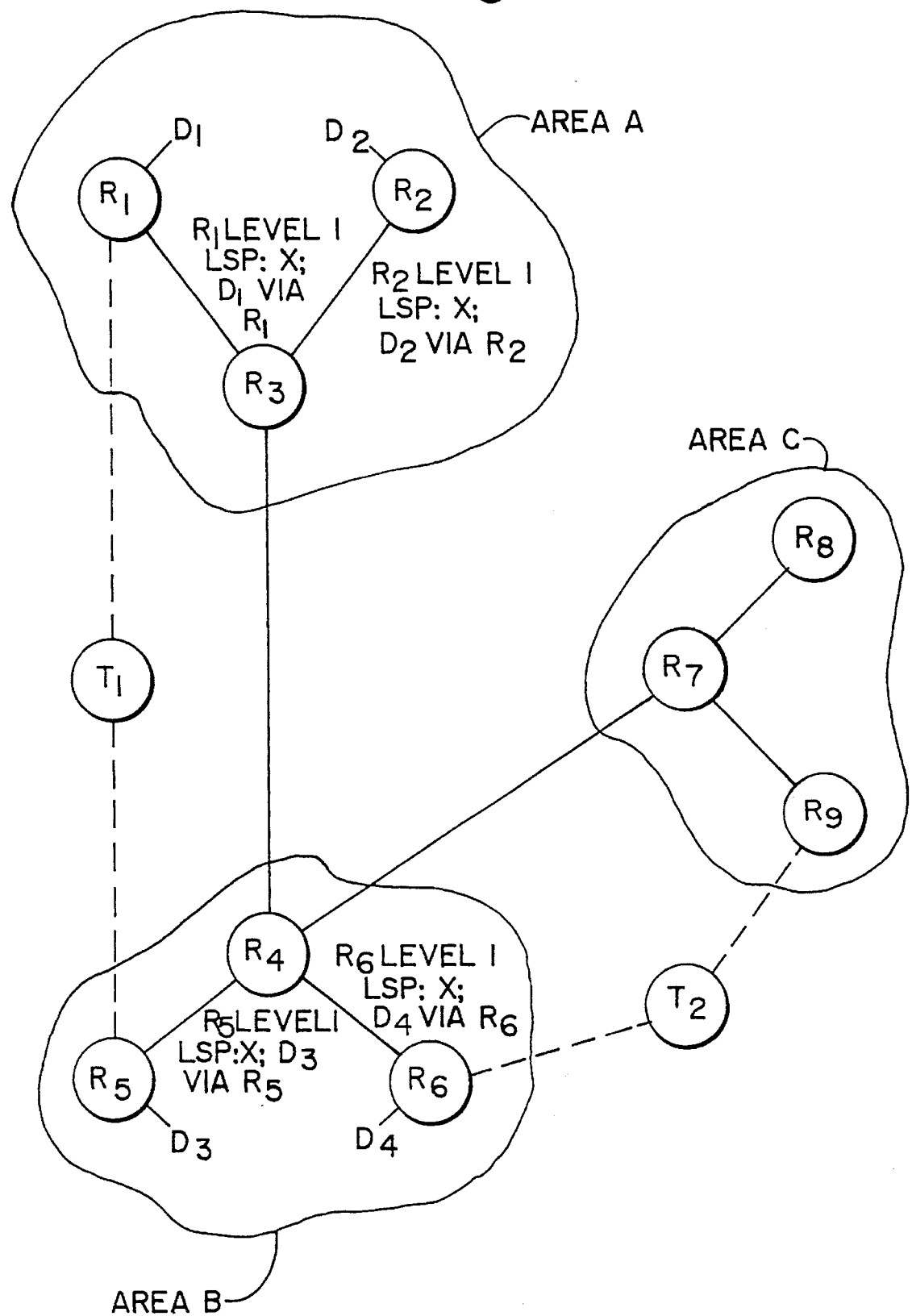
FIG. 2 is a simplified schematic diagram of a network topology in which foreign protocol destinations communicate between areas via tunnels without modification of the associated level two routers.
Figure 3:
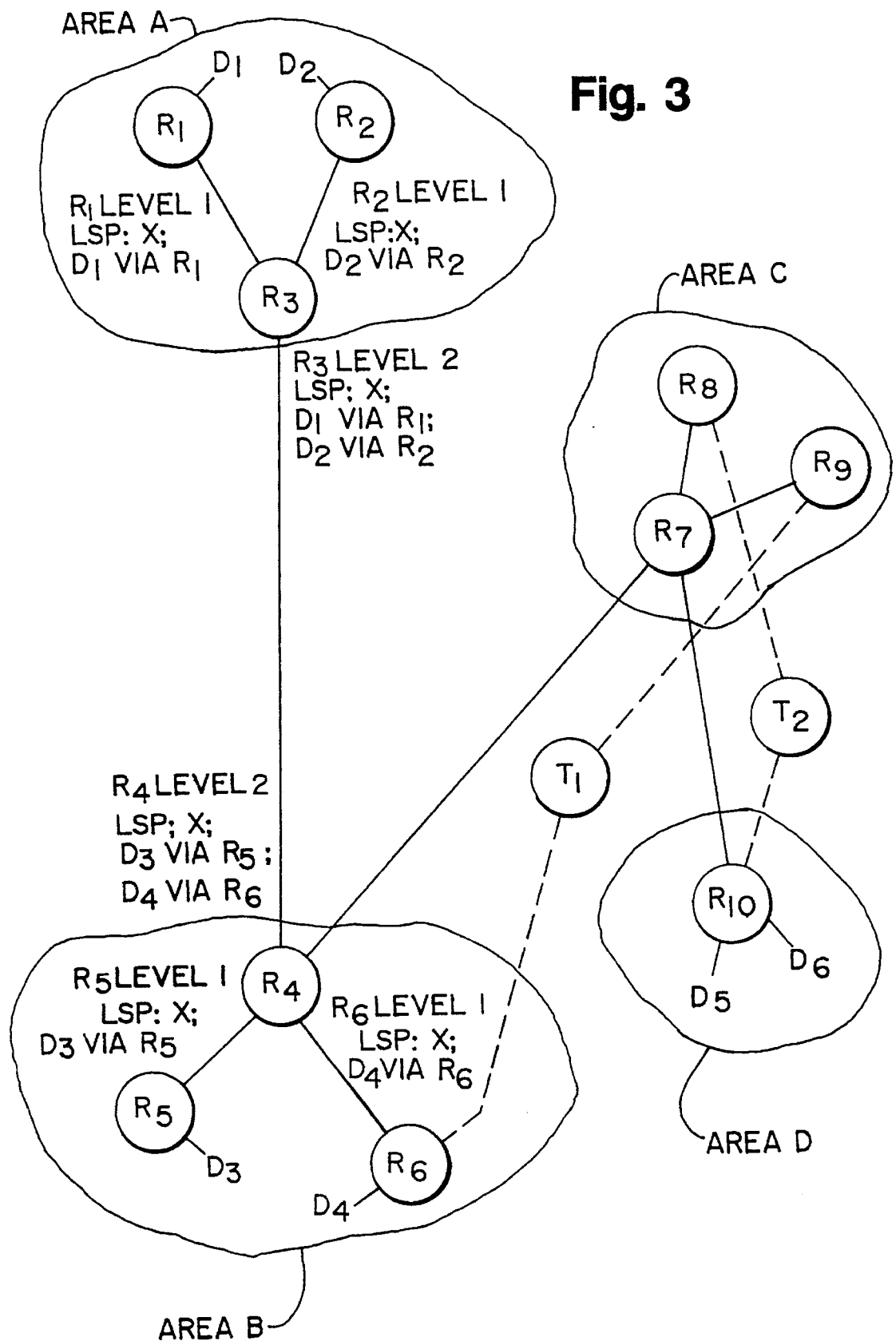
FIG. 3 is a simplified schematic diagram of a network topology in which foreign protocol destinations communicate between areas via a combination of modified level two routers and tunnels.

An important difference between the establishment of tunnels between areas and the prior art method previously described is that the method of the present invention provides for information learned through tunnels to be relayed to other areas through other tunnels. In other words, a tunnel between XIS-routers in area A and area B will exchange information about XIS-routers in area C. As previously noted, prior art networks only have the capability to pass information about the existence of protocol X destinations from one area to an area in direct communication therewith. The present invention is advantageous because it requires fewer tunnels to ensure that all necessary information about the existence of protocol X destinations propagates everywhere in the network. Systems that employ tunnels to inform other areas of the existence of protocol X destinations are illustrated in FIGS. 2 and 3.

A final contemplated method of identifying XIS-routers involves configuring the addresses of all XIS-routers into all XIS-routers and having each pair of XIS-routers communicate as neighbors to exchange protocol X information. This method of identifying XIS-routers is not recommended because it does not scale well to large networks.

After all XIS-routers have discovered each other, they can communicate as though the IS-IS backbone network were a single data link and treat all the other XIS-routers as protocol X neighbors. As the number of XIS-routers in the system grows, however, it becomes cheaper to piggyback the protocol X information inside the IS-IS LSPs, so that it can be automatically distributed.

The second problem encountered in exchanging foreign protocol information across network areas is, simply stated, logistical difficulties encountered because of the nature of the foreign protocol information to be transferred. However, these logistical problems are similar in some respects to the problem of foreign protocol destination identification. For instance, the same issues arise as to how information is to be passed between areas in the network. The previously described solutions apply to this problem as well. Either the level two router summarizes the area information in its level two LSP and additionally summarizes the external information it learns from the level two network in its level one LSP or tunnels are established to pass information across level two routers that are not XIS-routers.

One specific logistical problem is the management of cost accounting information for the foreign protocol information. As is well-known to those of ordinary skill in the field, different protocols support different methods of accounting for the cost of an information transfer. One commonly known method of determining cost of a transfer is the method used by the IS-IS protocol, which assigns a value between 1 and 63 for the cost of a link to a neighbor. Other routing protocols, such as NetWare IPX™ and Appletalk™, determine cost based on the number of transfers or "hops" between the origin of the transfer and its destination. Difficulty arises when information from a protocol that determines cost based on hops is transferred to a protocol that determines cost by some other method.

Problems associated with assigning costs to inter-area data transfers of foreign protocol information are addressed in the present invention by providing a system that recognizes the cost metric associated with a foreign protocol data transfer and responds accordingly. Hop-based protocols tend to be distance vector oriented, whereas IS-IS is link state. If protocol X is a distance vector protocol based on hops, the present invention ensures that IS-routers and X-routers are able to interface without any modification to the routers. This cannot be accomplished if the cost metric to a destination is ever allowed to get smaller as information about the destination propagates through the network. If the cost metric is allowed to get smaller, or even stay the same, there is the possibility that undesirable routing loops will result.

IP protocols tend to solve this problem by assuming there are "internal" and "external" metrics and that no knowledge exists about the external metric. If a destination is learned about through an external metric, the associated packet is routed toward the router that advertises the lowest external metric, ignoring the cost of the internal path to the routers that advertise reachability to the destination.

In a preferred embodiment of the present invention, the cost metric for protocol X is acknowledged to be hops. If there is a direct path to a protocol X destination within the area (i.e. the destination was not learned of through an X-router, a level two router or a tunnel), then the associated packet is routed according to the normal IS-IS protocol metric. However, if no direct path to a protocol X destination exists, the packet is routed based on hops, with one modification. To fully provide routing based on the minimum number of hops, it is necessary to recompute routes minimizing the number of hops rather than the IS-IS protocol metric.

Rather than requiting recomputation of routes, the present invention provides two different methods to optimize routing. In the first method, the number of hops to destination $D_n$ is incremented by one for traversal of a tunnel or an area. Thus, when any router reports that it can reach a protocol X destination, it must add one to the number of hops needed to reach $D_n$ if the existence of $D_n$ was learned of from another XIS-router or through a tunnel.

In the second method, the number of hops to the destination $D_n$ is incremented by the number of hops on the path chosen by IS-IS to the router from whom the existence of $D_n$ was learned. It should be noted that the second method cannot be employed for routes that include traversal of tunnels because the number of hops to the endpoint is not necessarily known with certainty. These two strategies of providing an acceptable system of optimizing routes for inter-area transfers across a network that uses a different accounting metric are further discussed and illustrated with reference to FIG. 3 and FIG. 4.

As previously noted, a second problem encountered in transferring foreign protocol information across a backbone network involves the optimization of route selection of foreign protocol data packets. To solve this problem, protocol X data packets must be encapsulated within IP or CLNP in order to traverse the IS-IS backbone network. Two methods of encapsulation are employed. In a first method, if information about the destination $D_n$ was learned from a level two XIS-router $R_1$ or a tunnel endpoint $R_1$, then an XIS-router $R_2$ will use the address of $R_1$ as the destination in the IP or CLNP header. In this case, $R_1$ will have to de-encapsulate the packet and re-encapsulate it with new information to move it toward the XIS-router from which $R_1$ learned about $D_n$. Although this method of encapsulation is effective, it requires multiple iterations of encapsulation and de-encapsulation, which tend to slow system performance.

The preferred encapsulation method is to carry information about the final XIS-router attached to the destination in the protocol X information so that $D_n$ is propagated through tunnels and level two routers along with this information and the cost of the path to $D_n$. An additional benefit of this method is that it allows the XIS-router address that should be used to reach $D_n$ to be used when encapsulating protocol X information destined for $D_n$. This method avoids multiple encapsulation and de-encapsulation steps.

A number of alternative embodiments of the present invention are contemplated. The first alternative involves modification of the configuration of all level two routers in the network so that all level two routers have the capability of supporting the foreign protocol information (i.e. modifying the configuration of all level two routers to be XIS-routers). Because modification of the configuration of all level two routers in a network may not be feasible, a second alternative allows foreign protocol information to be transferred between areas through tunnels without modification of the configuration of the level two routers. Reconfiguration of the level two routers is preferable to the use of tunnels because routers can manage the network topology automatically. Although, the solution resulting from the modification of all level two routers is simpler, tunnels are used if the level two routers cannot be (or have not been) modified to be XIS-routers.

As will be appreciated by those of ordinary skill in the field, modification of all level two routers in a network might be inefficient because at least some level two routers may not have any foreign protocol neighbors. Thus, a more practical alternative embodiment of the present invention involves the use of modified level two routers where such modification is feasible and tunnels established from areas that contain both foreign protocol destinations and modified level two routers to otherwise remote areas that contain foreign protocol destinations but whose level two routers cannot, for whatever reason, be modified to accommodate the foreign protocol.

FIG. 1 shows a simplified schematic diagram of a network topology in which foreign protocol information may be transferred to other areas via modified level two routers. As will be fully described hereinafter, this embodiment of the invention contemplates the modification of at least one level two router in each network area to accommodate protocol X (i.e., to become an XIS-router). As previously noted, this method of implementing the present invention is the most desirable from a system efficiency perspective, but may not be feasible in every particular case.

As shown in FIG. 1, a network area A includes protocol X destinations $D_1$ and $D_2$. Destination $D_1$ is connected to a router $R_1$ and destination $D_2$ is connected to a router $R_2$. Routers $R_1$ and $R_2$ are connected to a level two XIS-router $R_3$, which has been reconfigured to be an XIS-router. The routers $R_1$ and $R_2$ may be either X-routers or XIS-routers. It is essential for this embodiment of the present invention that the level two router (i.e., the router that transfers information to other areas—$R_3$ in area A) in each area is an XIS-router.

The level one LSPs sent by routers $R_1$ and $R_2$ include information indicating that they support protocol X and that they are connected to the destinations $D_1$ and $D_2$, respectively. These LSPs are transmitted to the level two XIS-router $R_3$, which updates its level two LSP to indicate that it supports protocol X and can reach both destinations $D_2$ and $D_2$. Thus, the level two router $R_3$ learns of the existence of protocol X destinations $D_1$ and $D_2$ from the level one LSPs of the routers $R_1$ and $R_2$.

When data is transmitted between area A and a second area, area B, the level two LSP sent by the XIS-router $R_3$ to the XIS-router $R_4$ contains the information about protocol X destinations $D_2$ and $D_2$. When the XIS-router $R_4$ receives this information, it updates its level one LSP to indicate the reachability to the destinations $D_1$ and $D_2$. Similarly, when the XIS-router $R_4$ transmits information to routers $R_5$ and $R_6$, the routers $R_5$ and $R_6$ learn of the existence of protocol X destinations $D_1$ and $D_2$ from the level one LSP of the XIS-router $R_4$.

The routers $R_5$ and $R_6$ are respectively connected to protocol X destinations $D_3$ and $D_4$. Like the routers $R_1$ and $R_2$ in area A, the routers $R_5$ and $R_6$ may be either X-routers or XIS-routers. As in area A, the level one LSPs transmitted by the routers $R_5$ and $R_6$ to the level two XIS-router $R_4$ contain information about the destinations $D_3$ and $D_4$ for protocol X. Upon learning this information, the level two router $R_4$ modifies its level two LSP to indicate that area B supports protocol X and that the destinations $D_3$ and $D_4$ can be found them. Thus, when XIS-router $R_4$ transmits any information to XIS-router $R_3$, $R_3$ learns of the existence of the destinations $D_3$ and $D_4$. The router $R_3$ then modifies its level one LSP accordingly. In subsequent transmission in area A, the routers $R_1$ and $R_2$ learn of the existence of the protocol X destinations $D_3$ and $D_4$ from the level one LSP of the XIS-router $R_3$.

The level two LSPs from routers $R_3$ and $R_4$ are propagated by the IS-IS update algorithm to an XIS-router $R_7$ in an area C. The XIS-router $R_7$ learns of the existence of protocol X destinations $D_1$ and $D_2$ from the level two LSP of the XIS-router $R_3$ and the destinations $D_3$ and $D_4$ from the level two LSP of the XIS-router $R_4$. Accordingly, the XIS-router $R_7$ updates its level one LSP to indicate the reachability of the protocol X destinations $D_1$, $D_2$, $D_3$ and $D_4$. As will be apparent from the foregoing discussion, as LSPs continue to be updated and transmitted between areas, all XIS-routers will systematically learn of the existence of all protocol X destinations in the network.

FIG. 2 shows a network similar in topology to the network shown in FIG. 1. However, the network of FIG. 2 allows the transfer of protocol X information via tunnels without performing modification to the level two routers. As in FIG. 1, the level one LSPs of the routers $R_1$ and $R_2$ contain information indicating that they support protocol X and that the protocol X destinations $D_1$ and $D_2$, respectively, are accessible therethrough. Additionally, the level one LSPs contain information specifying the router to which the destinations $D_1$ and $D_2$ are connected. The routers $R_1$ and $R_2$ are connected to a router $R_3$, which is not an XIS-router. Because the level two router $R_3$ has not been configured to support protocol X, it cannot alter its level two LSP to include the destinations $D_1$ and $D_2$ as reachable therethrough, so one or more tunnels must be established between Areas A and B. For example, a single tunnel, $T_1$, is established between routers $R_1$ and $R_5$. After the tunnel $T_1$ is established, the router $R_1$ extracts the information pertaining to reachable protocol X destinations from level one LSPs and sends this information to router $R_5$ across the tunnel $T_1$. Upon receiving this information, router $R_5$ modifies its level one LSP to indicate that it is aware of the protocol X destinations $D_1$ and $D_2$. This information is passed on to router $R_6$ in area B via the level one LSP of the router $R_5$. In a similar fashion, information about the protocol X destinations $D_3$ and $D_4$ is passed across tunnel $T_1$ from the router $R_5$ in Area B to the router $R_1$ in area A. Alternatively, routers $R_1$ and $R_5$ may be configured so that they do not pass information about the protocol X destinations through the tunnel $T_1$, but instead are configured with the protocol X destinations reachable through the tunnel.

At a time subsequent to the learning of the existence of the destinations $D_1$ and $D_2$ in area A by the router $R_5$, a tunnel $T_2$ is established between the router $R_6$ and a router $R_9$ in area C. Information about the existence of all protocol X destinations in areas A and B is extracted from level one LSPs by the router $R_6$ and passed across the tunnel $T_2$ to the router $R_5$ in area C. Similarly, any information about the protocol X destinations in area C and any area beyond area C is extracted from level one LSPs in Area C by the router $R_9$ and passed to Area B across the tunnel $T_2$ to the router $R_6$ and then passed by router $R_5$ across the tunnel $T_1$ to router $R_1$ in Area A.

FIG. 3 shows a network similar in structure to the networks shown in FIGS. 1 and 2. However, the network shown in FIG. 3 employs a combination of modified level two routers (XIS-router $R_3$ in area A and XIS-router $R_4$ in area B) and a tunnel ($T_1$, which is established between the routers $R_6$ and $R_9$) to facilitate the exchange of protocol X information throughout the network.

As previously noted, the router $R_3$ in area A and the router $R_4$ in area B have been modified to function as XIS-routers. Thus, the level one LSPs of the router $R_1$, which is connected to the protocol X destination $D_1$, and the router $R_2$, which is connected to the protocol X destination $D_2$, contain information identifying the destinations $D_1$ and $D_2$ as protocol X destinations. Also included in the level one LSPs at the routers $R_1$ and $R_2$ is information indicating that messages addressed to the destinations $D_1$ and $D_2$ should be encapsulated and routed through routers $R_1$ and $R_2$, respectively. When the XIS-router $R_3$ receives these LSPs, it updates its level two LSP to indicate the reachability of the destinations $D_1$ and $D_2$.

Subsequently, when the XIS-router $R_3$ transfers information to the XIS-router $R_4$, $R_4$ learns that the destinations $D_1$ and $D_2$ are reachable through the XIS-router $R_3$ and updates its level one LSP accordingly. Similarly, the protocol X destinations $D_3$ and $D_4$ in area B are respectively connected to the routers $R_5$ and $R_6$. The level one LSPs of the routers $R_5$ and $R_6$ communicate this information to the XIS-router $R_4$, which updates its level two LSP to indicate the reachability of the destinations $D_3$ and $D_4$. When the XIS-router $R_4$ transfers information to the XIS-router $R_3$ in area A, router $R_3$ learns of the existence of the destinations $D_3$ and $D_4$ and updates its level one LSP accordingly. In subsequent transmissions from the XIS-router $R_3$ to the routers $R_1$ and $R_2$ in area A, the routers $R_1$ and $R_2$ receive the information indicating the reachability of the protocol X destinations $D_3$ and $D_4$.

For whatever reason, the router $R_7$ has not been configured as an XIS-router. Thus, to provide the capacity to exchange protocol X information between Area C and Areas A and B, a tunnel, $T_1$, is established between the router $R_6$ in Area B and the router $R_9$ in Area C.

Furthermore, if the router $R_8$ in Area C has learned of the existence of additional protocol X destinations, for example, the destinations $D_5$ and $D_6$ attached to a router $R_{10}$ in area D through tunnel $T_2$, then the router $R_9$ extracts this information from the level one LSP of the router $R_8$ and communicates it to the XIS-router $R_6$ through the tunnel $T_1$. Upon learning of the additional protocol X destinations, the XIS-router $R_4$ updates its level two LSPs accordingly. In this manner, the existence of all protocol X destinations in the network is systematically made known throughout the network allowing the transfer of protocol X information between any two protocol X destinations in the network.

The two methods previously described for accounting for the use of different metrics for cost computation by the IS-IS and hop-based protocols (for example, Appletalk™) and for computing hop counts are illustrated in FIG. 3. In the first method, the number of hops to a destination $D_n$ is incremented by one for traversal of a tunnel or an area or the level two backbone network. For example, when router $R_1$ announces the destination $D_1$ as reachable in its level one LSP, it does so with the associated IS-IS cost for reaching the destination $D_1$. The level two XIS-router $R_3$ computes an IS-IS path cost to the destination $D_1$ through area A using the standard IS-IS shortest path computation algorithm. When the router $R_3$ announces the destination $D_1$ as reachable in its level two LSP, it does so with associated hop count of one (representing traversal of area A).

The router $R_4$ learns of the existence of the destination $D_1$ through the LSP of the router $R_3$. The router $R_4$ increments the hop count by one to yield hop count two. The router $R_4$ then announces the destination $D_1$ in its level one LSP with associated hop count of two. This LSP is received by all routers in Area B. In particular, the router $R_4$ increments the hop count for the destination $D_1$ by one (to represent traversal of Area B) to yield hop count three, which it then announces through the tunnel $T_1$ to the router $R_9$. The router $R_9$ increments the hop count by one (to represent traversal of the tunnel $T_1$ to yield hop count four, which it then announces in its level one LSP.

The level two router $R_7$ receives the LSP of the router $R_9$ but ignores the protocol X information about the existence of the destination $D_1$ because it is not an XIS-router. The router $R_8$ in area C increments the hop count for the destination $D_1$ by one (to represent traversal of area C) to yield hop count five, which is announced through the tunnel $T_2$ to the router $R_{10}$. The router $R_{10}$ increments the hop count for the destination $D_1$ by one (to represent traversal of the tunnel $T_2$) to yield hop count six, which is announced in its level one LSP.

In the second method, the existence of the destination $D_1$ is propagated through the network as before, but at each XIS-router, the hop count is incremented, not by one, but by the actual number of hops in the shortest path to the router whose LSP contained the destination $D_1$. For example, suppose there was actually one more router on the shortest path between the routers $R_1$ and $R_3$. Then the hop count increment computed by the router $R_3$ would be two since there would then be two hops to go from the router $R_1$ to the router $R_3$. Therefore, the router $R_3$ announces the destination $D_1$ in its level two LSP with hop count two.

Figure 4:
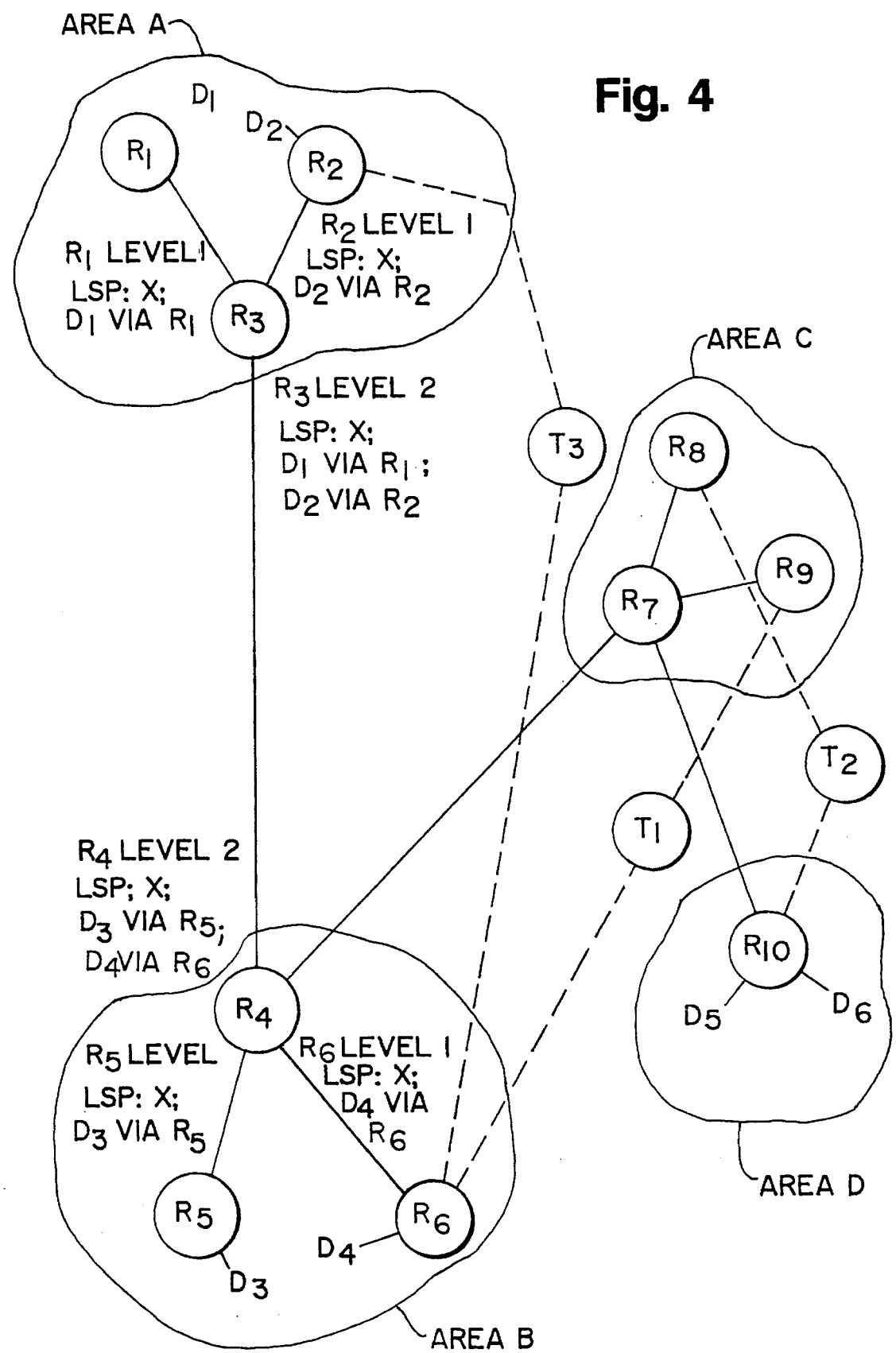
FIG. 4 is a simplified schematic diagram of a network having a topology that facilitates discussion of the cost accounting properties employed by the present invention to optimize routing between foreign protocol networks and the backbone network.

FIG. 4 shows a network topology that demonstrates why the number of hops associated with a given transfer must not be decreased as information about protocol X destinations is propagated throughout the network. The topology shown in FIG. 4 is similar to the topology shown in FIG. 3 with the exception that a tunnel $T_3$ is established between the routers $R_2$ and $R_6$. Because the routers $R_3$ and $R_4$ are XIS-routers, the tunnel $T_3$ is not necessary for making all protocol X destinations reachable, but such a tunnel may be present during migration from tunnels to XIS-routers.

The router $R_6$ learns about the destination $D_6$ through the tunnel $T_1$ with some associated hop count. For example, assume that the router $R_6$ learned that the hop count for this transmission is four. Next, the router $R_6$ announces the destination $D_6$ with hop count five through tunnel $T_3$ and, accordingly, modifies its level one LSP. If the router $R_2$, upon learning of the existence of the destination $D_6$ at hop count five through tunnel $T_1$, announces the destination $D_6$ with a lower hop count (for example, one) in its level one LSP, then router $R_3$ computes the shortest route to the destination $D_6$ to be through router $R_2$ and announces the destination $D_6$ with hop count two in its level two LSP. Router $R_4$ then computes the shortest path to the destination $D_6$ to be through the router $R_3$ and announces the destination $D_6$ with hop count three in its level one LSP. Router $R_6$ then computes its shortest path to the destination $D_6$ to be through the router $R_4$.

Now, any packet destined for the destination $D_6$ that is forwarded through any of the routers $R_2$, $R_3$, $R_4$ or $R_6$ will be forwarded around the loop connecting those four routers indefinitely. The cause of the problem is that the router $R_2$, although it knows to forward packets for the destination $D_6$ to the router $R_6$, has caused the router $R_6$ to believe an erroneous best path for reaching the destination $D_6$ that itself contains the router $R_2$. This is true because the router $R_2$ decreased the hop count for the destination $D_6$ in its level one LSP announcement.

Thus, their has been described herein a method for supporting the exchange of foreign protocol information across a hierarchical backbone network. It will be understood that various changes in the details and arrangements of the implementation described herein will occur to those skilled in the art without departing from the principle and scope of the present invention. While the invention has been described with reference to the presently contemplated best mode for its practice, it is intended that this invention only be limited by the scope of the appended claims.

What is claimed is:

1. A method of transferring information across a computer network that operates according to a first protocol, said computer network being comprised of areas having a plurality of destinations, with each area having at least one destination and each destination having a location within said areas, some of said destinations operating according to a second protocol, and each of said areas having at least one router connected to said destination for supporting both said first protocol and said second protocol located therein, said method of transferring information comprising the steps of:

generating by a first router a first list of the location of each destination in a first area supporting said second protocol, said first router supporting both said first protocol and said second protocol in said first area;

transmitting the first list from said first router to a second router supporting both said first protocol and said second protocol in a second area;

generating, by said second router in said second area, a second list of the location of each destination within said first area and said second area supporting the second protocol;

transmitting the second list from the second router to a third router supporting both said first protocol and said second protocol in a third area;

transferring information identifying destinations in said second area and third area that operate under said second protocol from said router in said second area to said router in said first area.

2. The method of transferring information of claim 1, wherein said first list includes an identification of at least one router in said first area and said second list includes an identification of at least one router in said second area and said first list.

3. The method of transferring information of claim 1, wherein said first protocol destinations manage information transfer costs according to a first scheme and the second protocol manage information transfer costs according to a second scheme, said method further comprising the steps of:

encoding cost information by said computer network to produce encoded cost information relating to data transmission to each of said destinations with said information that identifies the locations of said destinations; and optimizing route selection of data packets transferred between destinations operating under said second protocol based on said cost information.

4. The method of transferring information of claim 3, wherein said encoded cost information for said second protocol cost information is expressed in hops between points and wherein said step of optimizing route selection includes the step of adding one to the number of hops to reach a given destination before announcing an existence of said given destination to another router.

5. A method of transferring information across a computer network operating under a first protocol, said computer network including a plurality of areas, each of said areas including at least one destination and each of said destinations having a location within said areas, each of said areas having at least one router connected to said destination, some of said routers operating under a second protocol, said routers transmitting link state packets, said method of transferring information comprising the steps of:

encoding by said router in a second area said link state packets from said router in a first area having said destinations attached thereto with transfer information including an identity of said location of said destinations in the first area supporting said second protocol, wherein a unique designator identifying the destination the router to which said destination is attached;

transmitting said link state packets to at least one other router connected thereto in a third area, wherein said at least one other router receives the link state packets and decodes said transfer information;

establishing a tunnel between one of said routers in said first area and a router in a second area;

transferring information identifying destinations in said second area that operate under said second protocol and destinations in said third area that operate under said second protocol from said router in said second area to said router in said first area.

\* \* \* \* \*